June 9, 1942.  J. MERCIER  2,285,604
PLANT AND DEVICE FOR FLUID CONTROL
Filed Feb. 28, 1940

Jean Mercier
INVENTOR
his ATTY.

Patented June 9, 1942

2,285,604

UNITED STATES PATENT OFFICE 2,285,604

PLANT AND DEVICE FOR FLUID CONTROL

Jean Mercier, Neuilly-sur-Seine, France

Application February 28, 1940, Serial No. 321,286
In Belgium April 5, 1937

5 Claims. (Cl. 60—51)

The present invention relates to devices for the fluid pressure control of parts or mechanisms adapted to occupy either of two different positions, such for instance as aircraft retractable landing gears, wing flaps, and the like.

The chief object of the present invention is to provide a device of this type which is better adapted to meet the requirements of practice than those used for the same purpose up to the present time, and, in particular, which automatically ensures the return of the part or mechanism (for instance a retractable landing gear) into one of these two positions (always the same) in case of the normal control means failing to work for any reason.

Other objects of the present invention will result from the following detailed description of some specific embodiments thereof.

A preferred embodiment of the present invention will be hereinafter described, with reference to the accompanying drawing, given merely by way of example, and in which.

Figure 1:
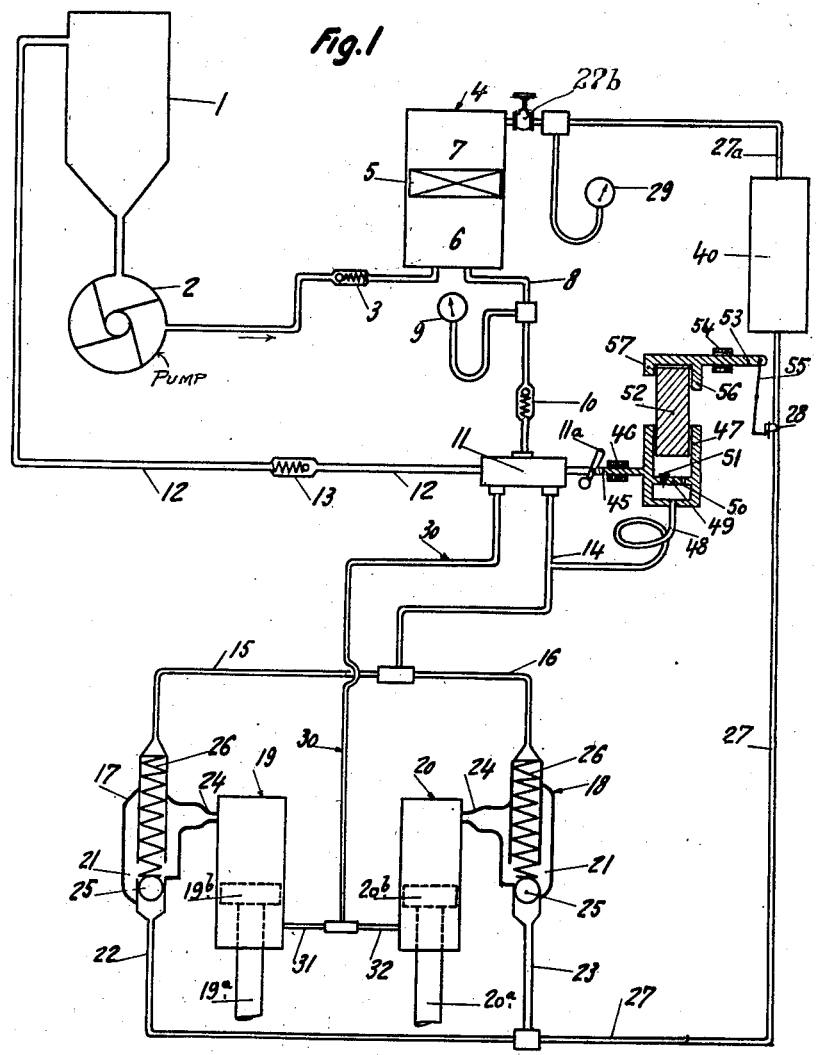
Fig. 1 is a diagrammatic view of an embodiment of the invention.

In Fig. 1, reference character 1 designates a tank for oil or another fluid. This tank 1 is connected with a pump 2, which is in turn connected through a check valve 3 with the lower chamber 6 of a storage tank 4, the other chamber 7 of which is separated from chamber 6 by a movable partition 5. Chamber 7 is, for instance, filled with compressed air.

Chamber 6 communicates through a line 8 fitted with a check valve 10 with the distributor means 11. A pressure gauge 9 is advantageously connected to line 8.

The distributor means consists of a reversing valve 11 cooperating with the following lines:

a.—Line 8 above mentioned;
b.—Return line 12, leading back to tank 1 through check valve 13;
c.—Main feed line 14; and
d.—Main feed line 30.

Valve 11 is controlled by member 11a so as to be brought into at least two different positions.

In its first position, valve 11 connects line 8 with line 14, while it connects line 30 with return line 12.

In its second position, valve 11 connects line 8 with line 30, while it connects line 14 with return line 12.

Reference numerals 19a and 20a designate the two parts to be controlled by the device according to the invention. It will be for instance supposed that they are elements of a retractable landing gear.

These elements 19a and 20a are respectively carried by pistons 19b and 20b, mounted in the corresponding cylinders 19 and 20.

Now, line 30 communicates, through branch lines 31 and 32, with the portions of said cylinders located under the respective pistons.

On the other hand, line 14 is adapted to communicate, through branch lines 15 and 16, with chambers 21, opening respectively into the portions of the cylinders located above their pistons.

Another line 27, called the auxiliary line, is also adapted to communicate, through branch lines 22 and 23, with said chambers 21, respectively.

Each of these chambers 21 is fitted with valve means for connecting it, alternately, either to line 15 (or 16) or to line 22 (or 23) according as the pressure in each of these lines is higher than the pressure in the other. In other words, when the pressure in line 15 (or 16) is higher than the pressure in line 22 (or 23), said valve means opens the connection between 15 (or 16) and chamber 21 and simultaneously closes the connection between said chamber and 22 (or 23). Alternately, when the pressure in 22 (or 23) is higher than the pressure in 15 (or 16) the valve means opens the connection between 22 (or 23) and chamber 21, while closing the connection between said chamber and 15 (or 16). However, advantageously, a spring 26 urges the valve means, constituted for instance by a ball 25, toward the position closing the connection between 21 and 22 (or 23), so that, in order to open this connection, the pressure in line 22 (or 23) must be higher than the pressure in line 15 (or 16) by an amount at least equal to the strength of said spring.

Line 27 is connected to a source of fluid pressure, with the interposition of a cock 28 between said line and said source.

For instance, line 27 is filled with oil and opens, at the top, into a chamber 40, partly filled with said oil, and the top portion of which, filled with compressed air, can communicate, through a line 27a controlled by a cock 27b (and advantageously fitted with a pressure gauge 29) with the top chamber 7 of storage tank 4. The pressure in chamber 40 having been made equal to that in chamber 7 by opening cock 27b for a short time, this cock is then closed for the operation of the device. If, after a time, gauge 29 shows a substantial drop of the pressure in chamber 40 (for the position of the parts illustrated by the drawing) cock 27b is again opened for a short time so as to restore the pressure in chamber 40 to its proper value. But it should be well understood that any other source of pressure might be used according to the invention. For instance, chamber 40 might be closed at the top, forming a compressed air reservoir wholly independent of storage tank 4.

This device works in the following manner:

According as valve 11 is in one position or the other, oil under pressure from line 8 will be fed either under or above the pistons, while the respective opposed faces of said pistons are connected to the return line 12. Accordingly the pistons will be brought into either the upper or the lower position, according to the position given to control member 11a.

When valve 11 is in the position connecting line 8 with line 30, cock 28 is kept closed. There is no pressure tending to lift valves 25 from their lower seats. On the contrary, when valve 11 is in the other position (connecting line 8 with line 14) cock 28 must be opened, either manually or otherwise. But the sum of the pressure in line 15 and 16 and of the strength of spring 26 is higher than the pressure in line 27. Valves 25 therefore remain, in this case also, in their lower positions.

This is the normal operation.

If now, when line 14 is being connected through valve 11 with line 8, in order to bring the pistons to their lower positions, some damage occurs to the normal control circuit (breakdown of pump 2, bursting or leakage of line 14 or line 8, etc.) and since, at this time cock 28 is open, the pressure in line 27 is now higher than the pressure in lines 15 and 16 by a considerable amount (more than sufficient to overcome the resistance of springs 26), balls 25 are lifted from their lower seats. Thus, they open the connection between chambers 21 on the one hand and lines 22 and 23 respectively on the other hand, and at the same time they close the connections between said chambers 21 and lines 15 and 16 respectively, and the pressure of line 27, transmitted to the upper chambers of cylinders 19 and 20 pushes the corresponding pistons 19b and 20b into their lower positions.

Thus, in case of failure of the normal control means to bring the landing gear into one given position, auxiliary conduit 27 automatically remedies this failure.

It should be noted that if, after thus bringing the pistons into their lower positions, cock 28 is closed, it becomes impossible to bring back the pistons to their upper positions because, when line 30 is then connected through valve 11 with feed line 8, the fluid pressure fed through 31 and 32 under the pistons can no longer have any effect. This is due to the fact that the oil above said pistons cannot escape through 15 and 16 (since balls 25 are in their upper positions) nor through line 27, which is entirely filled with oil without any possible exhaust (since cock 28 is closed).

Therefore, if, after pistons 19b and 20b have been lowered through the action of the pressure in auxiliary line 27, cock 28 is closed, said pistons remain hydraulically locked in this position, even if line 30 is not injured and is connected with line 8 through valve 11. The same locking can be obtained at will in the absence of any injury to line 14 if valve 11 has a neutral position in which it connects both of lines 14 and 30 with discharge line 12. In this case, it suffices to open cock 28 until the pistons are lowered by the pressure in 27 and then to close it again. The pistons are then locked in their lower positions.

It is thus clear that the device according to the invention permits of locking a landing gear in one of its positions, irrespective of the displacements which are then imparted to the control member 11a of distributor valve 11.

However, it will be understood that, under normal working conditions, cock 28 should be opened when valve 11 is in the position connecting 14 with 8, and closed when valve 11 is in the position cutting off 14 from 8. Thus the emergency means constituted by line 27 are ready to operate as long as 14 is supplied with fluid pressure, but they do not prevent the action of fluid pressure fed through line 30, when 14 is cut off from 8.

But, on the other hand, if after the opening of cock 28, occurring simultaneously with the placing of control member 11a into the position connecting line 14 with line 8, there is a pressure drop in line 14 so that the auxiliary pressure source is caused to operate through line 27 as above described, then the return of valve 11 to the position connecting line 30 with line 8 should not be accompanied by the closing of cock 28. Because, if in this case, cock 28 remains open, and provided, of course, that line 30 is not injured, the pistons can still be operated in both directions, as follows: when fluid pressure is supplied to line 30 and below the pistons, the oil above said pistons can escape from the cylinders into pipes 22 and 23 and pipe 27 because cock 28 is open and the back flow of oil through 27 merely produces an elastic compression of the air entrapped in the top part of cylinder 40 (which air has precedingly expanded) in order to drive pistons 19b and 20b downwardly when the main supply line 14 has failed to feed liquid under pressure. The upward movement of the pistons is further made possible by the fact that the pressure in 27 is limited while the pressure in 30, supplied by pump 2, can be increased as desired.

Therefore, if, after the emergency means (line 27 and air cushion in 40) have been called into play by a deterioration of line 14, cock 28 remains open, it is still possible either to lift the pistons, by connecting 30 with 8 through 11, or to lower them, by cutting off this connection, the operation being then produced by the pressure accumulated in 40.

The invention therefore provides means for automatically controlling the operation of cock 28 in response both to displacements of control member 11a and to accidental variations of pressure in 14.

These means must comply with the following conditions:

In all cases, when 11a is operated to bring line 14 into communication with line 8, cock 28 must be opened simultaneously.

When, inversely, control member 11a is operated to close the communication between 14 and 8 and to open the communication between 30 and 8, two cases may occur:

a.—If, at this time, line 14 is uninjured, that is to say is under pressure, this return movement of 11a must bring back cock 28 into the closed position;

b.—If pipe 14 is injured so that it is no longer under pressure this movement of 11a must leave cock 28 open.

Connecting means between 11a and 28 complying with these conditions are shown by the drawing.

Control member 11a is connected with a sliding part 45, mounted in a guide 46. Part 45 carries a cylinder 47, provided with a plunger piston 52. Cylinder 47 is connected at its lower end with a line 14 through a flexible tube 48.

The top part of piston 52 cooperates with a sliding part 53 guided by a support 54. Piston 52 is placed between two downward projections 56 and 57 of said part 53. Part 53 operates cock 28 through a lever 55.

When piston 52 is in its upper position it imparts its horizontal displacements to part 53 in both directions since it is engaged between the projections 56 and 57 of said part 53.

The downward displacement of piston 52 is limited by a partition 49 provided in cylinder 47 so that the top part of the piston can never come below the bottom part of projection 56. When piston 52 is resting on partition 49, it can transmit its horizontal displacements toward the right to piece 53 through projection 56, but its displacements toward the left no longer influence part 53 because said piston now passes under projection 57 without touching it.

Partition 49 is provided with a check valve 51 which permits fluid to flow freely from line 48 to the under face of piston 52, and said partition 49 is also provided with a passage 50 of very small section so that, in case of the pressure in 14 and 48 dropping down to zero, the pressure existing in the space between partition 49 and the under face of piston 52 takes a certain time to drop back to zero.

This connecting device works in the following manner:

It will be supposed that when 11a is inclined toward the right, as shown by the drawing, line 14 is connected with line 8. On the contrary, when 11a is turned toward the left, moving the whole of part 45, cylinder 47, and piston 52 toward the left, line 14 is not connected with 8.

In this last mentioned position, there is no pressure in 14 nor in 48, so that piston 52 rests on partition 49.

Starting from the position shown, when 11a is pivoted toward the right, the whole of 45, 47 and piston 52 is also caused to slide toward the right. In the course of this movement, the top part of piston 52 bears against projection 56 and imparts this movement toward the right to sliding member 53, which produces the opening of cock 28.

The pressure fed to 14 by line 8 is transmitted through conduit 48 to the space under piston 52 and it causes said piston to move upwardly and to engage between projections 56 and 57.

Therefore, if everything is normal, when subsequently member 11a is pivoted toward the left, this movement is transmitted to part 53 and cock 28 (which is thus closed) through piston 52 acting on projection 57. It will be noted that, during the short time necessary for this displacement, piston 52 remains in the upper position it occupied because oil has not had time to escape through the small passage 50 to any substantial amount.

On the other hand, if the conditions are not normal, that is to say if at any time after the pivoting of control member 11a toward the right, there is a lack of pressure in line 14 and conduit 48, oil does not flow into cylinder 47, or the oil which had flown into said cylinder has sufficient time to flow back through passage 50. Therefore piston 52 remains in its lower position so that it cooperates with projection 56 but not with projection 57. Therefore the movement of 11a toward the right produces the opening of cock 28 but the return of 11a toward the left does not close this cock.

Figure 2:
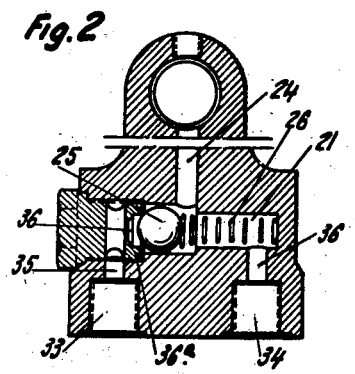
Fig. 2 is a sectional view of a valve construction adapted to be used in connection with said embodiment.

Fig. 2 shows a particular construction of the valve means including ball 25 and spring 26. This construction provides two couplings 33 and 34 adapted to cooperate, respectively, with lines 22 and 15 (or 23 and 16) and passages 35 and 36 leading from said couplings respectively to chamber 21. A removable piece carries the seat 36a of ball 25.

Figure 3:
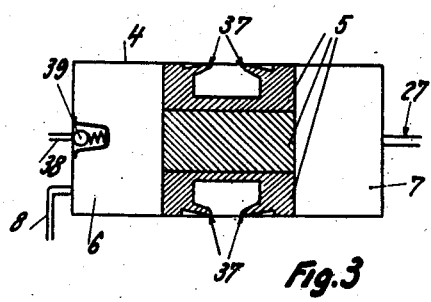
Fig. 3 is a diagrammatic view of a storage tank for fluid adapted to be used in connection with said embodiment.

The storage tank of Fig. 3 is characterized by the fact that piston 5 is provided with packing elements having elastic sealing lips 37. The line 3 through which oil under pressure is fed to chamber 6 is fitted with a check valve 39.

The present application is a continuation in part of my prior patent application Ser. No. 138,102, filed April 21, 1937, and now forfeited and abandoned.

While I have, in the above description, disclosed what I deem to be practical and efficient embodiments of the present invention, it should be well understood that I do not wish to be limited thereto as changes can be devised in the arrangement, disposition and form of the parts without departing from the principle of the present invention as comprehended within the scope of the accompanying claims.

What I claim is:

1. A system of the type described which comprises, in combination, a fluid pressure responsive double acting device, a source of fluid pressure for supplying operating fluid to said device, a main supply line leading to one side of said device for operation thereof in one direction, another main supply line leading to the other side of said device for operation thereof in the other direction, a discharge line, distributor means for alternately connecting one of said main lines with said source and the other with said discharge line, an auxiliary line leading to the same side of said device as said first mentioned main line, a source of fluid under pressure, means operative by said distributor means for connecting said auxiliary line with said second mentioned source of pressure when said distributor means is brought into the position placing said first mentioned supply line in communication with its source of fluid pressure, and valve means interposed between said first mentioned main supply line and said auxiliary line so as alternately to connect one with said device while disconnecting the other therefrom, these valve means being differentially operative by the respective fluid pressures in these two last mentioned lines respectively for connecting said auxiliary line with said device as soon as a breakdown causes a given lack of pressure in the first mentioned main line in communication with said first mentioned source of pressure.

2. A system of the type described which comprises, in combination, a fluid pressure responsive double acting device, a source of fluid pressure for supplying operating fluid to said device, a main supply line leading to one side of said device for operation thereof in one direction, another main supply line leading to the other side of said device for operation thereof in the other direction, a discharge line, distributor means for alternately connecting one of said main lines with said source and the other with said discharge line, an auxiliary line leading to the same side of said device as said first mentioned line, an auxiliary source of fluid under pressure, means, including a cock, for connecting said second mentioned source of pressure with said auxiliary line, means operative by said distributor means for opening said cock when said distributor means are in the position connecting said first mentioned line with said first mentioned source and normally closing said cock when said distributor means are in the other position, said cock operating means being further responsive to pressure variations in said first mentioned line so as to leave said cock in the opened position thereof when said distributor means is brought back into the second mentioned position thereof after a given drop of pressure has occurred in said first mentioned line in communication with said first mentioned source of pressure, and valve means interposed between said first mentioned main supply line and said auxiliary line so as alternately to connect one with said device and to disconnect the other therefrom, these valve means being differentially operative by the respective fluid pressures in these two last mentioned lines respectively for connecting said auxiliary line with said device as soon as a breakdown causes a given lack of pressure in the first mentioned main supply line in communication with said first mentioned source of pressure.

3. A system of the type described which comprises, in combination, a fluid pressure responsive double acting device, a source of liquid under pressure for supplying operating fluid to said device, a main supply line leading to one side of said device for operation thereof in one direction, another main supply line leading to the other side of said device for operation thereof in the other direction, a discharge line, a distributor means for alternately connecting one of said main lines with said source and the other with said discharge line, an auxiliary line filled with liquid leading to the same side of said device as said first mentioned main line, a hydropneumatic accumulator, means, including a cock, for connecting the liquid in said accumulator with said auxiliary line, means operative by said distributor means for opening said cock when said distributor means is in the position connecting said first mentioned main line with said source of fluid under pressure and normally closing said cock when said distributor means is in the other position, said cock operating means being further responsive to pressure variations in said first mentioned main line so as to leave said cock open when said distributor means are brought back into the second mentioned position thereof after a drop of pressure having occurred in the first mentioned main line in communication with said source of fluid under pressure, and valve means interposed between said first mentioned main supply line and said auxiliary line so as alternately to connect one with said device while disconnecting the other therefrom, these valve means being differentially operative by the respective fluid pressures in these two last mentioned lines respectively for connecting said auxiliary line with said device as soon as a breakdown causes a given drop of pressure to occur in the first mentioned main line in communication with said source of fluid under pressure.

4. A system of the type described comprising at least one fluid actuated device, a storage device containing a fluid under pressure; a movable fluid tight partition inside said device separating it into two chambers one of which contains a liquid and the other a gas, a main circuit connecting one of said chambers with said fluid actuated device, valve means inserted in said main circuit, at least one auxiliary independent circuit acting as a duplicate of the first one, connected with said other chamber including means for supplying liquid to said auxiliary circuit and abutting into said valve means where it is connected with said main circuit, said valve means having an outlet directly connected with said fluid actuated device and comprising a valve member subjected to the opposing action of the pressures prevailing in said two circuits and adapted to close the circuit having the lowest pressure, elastic reaction means adapted to act upon said valve member so as to close the auxiliary circuit when the plant operates in normal condition.

5. A system of the type described which comprises, in combination, a fluid pressure responsive double acting device, a storage device containing a fluid under pressure, for supplying operating fluid, a movable fluid tight partition inside said device separating it into two chambers one of which contains a liquid and the other a gas, a main supply line connecting one of said chambers to one side of said double acting device for operation thereof in one direction, another main supply line connecting the same chamber to the other side of said double acting device for operation thereof in the other direction, a discharge line, distributor means for alternately connecting one of said main lines with said storage device and the other with said discharge line, an auxiliary line connecting the other of said chambers to the same side of said device as said first mentioned main line and including means for supplying liquid to said auxiliary line, and valve means interposed between said first mentioned supply line and said auxiliary line so as alternately to connect one with said double acting device while disconnecting the other therefrom, said valve means being differentially operative by the respective fluid pressures in these two last mentioned lines respectively for connecting said auxiliary line with said device as soon as the pressure in the first mentioned main line in communication with said first mentioned source of pressure drops by a given value below the pressure in said auxiliary line.

JEAN MERCIER.